United States Patent
Narasimhan

(10) Patent No.: US 7,505,788 B1
(45) Date of Patent: Mar. 17, 2009

(54) SPATIAL MULTIPLEXING WITH ANTENNA AND CONSTELLATION SELECTION FOR CORRELATED MIMO FADING CHANNELS

(75) Inventor: Ravi Narasimhan, Los Altos, CA (US)

(73) Assignee: Marvell International, Ltd., Hamilton (BM)

( * ) Notice: Subject to any disclaimer, the term of this patent is extended or adjusted under 35 U.S.C. 154(b) by 805 days.

(21) Appl. No.: 10/656,001

(22) Filed: Sep. 5, 2003

Related U.S. Application Data

(60) Provisional application No. 60/432,126, filed on Dec. 9, 2002.

(51) Int. Cl.
  *H04M 1/00* (2006.01)
  *H04Q 7/00* (2006.01)
(52) U.S. Cl. ............... 455/562.1; 465/63.1; 465/101; 465/13.3; 465/67.13; 465/67.11; 370/334; 370/329; 370/339
(58) Field of Classification Search ............. 455/562.1, 455/575.7, 101, 103, 67.13, 63.1, 153, 67.11, 455/561, 25, 3.01, 423, 63.4, 13.3; 370/334, 370/252
See application file for complete search history.

(56) References Cited

U.S. PATENT DOCUMENTS

| | | | |
|---|---|---|---|
| 6,377,636 B1 | 4/2002 | Paulraj et al. | |
| 6,452,981 B1 | 9/2002 | Raleigh et al. | |
| 6,801,580 B2 * | 10/2004 | Kadous | 375/267 |
| 6,850,741 B2 * | 2/2005 | Lei et al. | 455/101 |
| 2002/0181390 A1 | 12/2002 | Mody et al. | |
| 2003/0035491 A1 | 2/2003 | Walton et al. | |
| 2003/0043732 A1 | 3/2003 | Walton et al. | |
| 2003/0043929 A1 | 3/2003 | Sampath | |
| 2003/0223391 A1 * | 12/2003 | Malaender et al. | 370/334 |
| 2004/0082303 A1 * | 4/2004 | Giannakis et al. | 455/130 |

* cited by examiner

*Primary Examiner*—Huy Q. Phan

(57) ABSTRACT

A multiple-in multiple-out (MIMO) system may use an antenna selection operation to determine an optimum number and subset of active antennas for communication over correlated fading channels. The system may use second-order statistics, such as correlation matrices determined at a receiver, to determine the optimal number of antennas and transmit constellations.

34 Claims, 4 Drawing Sheets

SPATIAL MULTIPLEXING WITH ANTENNA AND CONSTELLATION SELECTION FOR CORRELATED MIMO FADING CHANNELS

CROSS-REFERENCE TO RELATED APPLICATIONS

This application claims priority to U.S. Provisional Application Ser. No. 60/432,126, filed on Dec. 9, 2002.

BACKGROUND

Multi-element antenna systems, including multiple-input multiple-output (MIMO) systems, may increase the capacity and diversity in wireless communication systems. Several communication techniques, including space-time coding and spatial multiplexing, have been developed to exploit the potential of MIMO systems. Spatial multiplexing focuses on the rate advantage whereas space-time coding focuses on the diversity advantage of MIMO systems.

Most MIMO systems use a statistical channel model that is an idealized abstraction of spatial propagation characteristics and assumes independent and identically distributed (i.i.d.) fading between different transmit-receive antenna pairs. In practice, however, the channel coefficients between different transmit-receive antenna pairs may exhibit correlation due to closely spaced antennas and clustered scattering typical in realistic environments. In such conditions, the capacity of MIMO channels can be substantially lower, depending on the level of correlation.

SUMMARY

A multiple-in multiple-out (MIMO) system may use an antenna selection operation to determine an optimum number and subset of active antennas for communication over correlated fading channels. The system may use second-order statistics, such as correlation matrices determined at a receiver, to determine the optimal number of antennas. Each of the active antennas may have the same data rate and be allocated substantially equal power.

The optimum number of antennas may be selected to maximize a minimum signal-to-noise ration (SNR) margin. For a ZF (Zero Forcing), MMSE (Minimum Mean Square Error), or V-BLAST (Vertical Bell Laboratories Layered Space-Time) detection scheme, the number $M_T$ and element indices p of active transmit antennas may be selected such that $$(M_T, p) = \operatorname*{argmax}_{(\tilde{M}_T, \tilde{p})} \frac{\lambda_{\min}(R_T(\tilde{M}_T, \tilde{p}))}{\tilde{M}_T(2^{b_T/\tilde{M}_T} - 1)} \cdot \tilde{\lambda}_{\min}(H_w^*(K_R, \tilde{M}_T) H_w(K_R, \tilde{M}_T)).$$

For a successive cancellation receiver (SCR) detection scheme, the number $M_T$ and element indices p of active transmit antennas may be selected such that $$(M_T, p) = \operatorname*{argmax}_{(\tilde{M}_T, \tilde{p})} \left\{ \frac{1}{\tilde{M}_T} \left[ \ln \det(R_T(\tilde{M}_T, \tilde{p})) + \sum_{j=1}^{\tilde{M}_T} \sum_{i=1}^{K_R - j} \frac{1}{i} - b_T \ln 2 \right] - \ln \tilde{M}_T \right\}.$$

DETAILED DESCRIPTION

Figure 1:
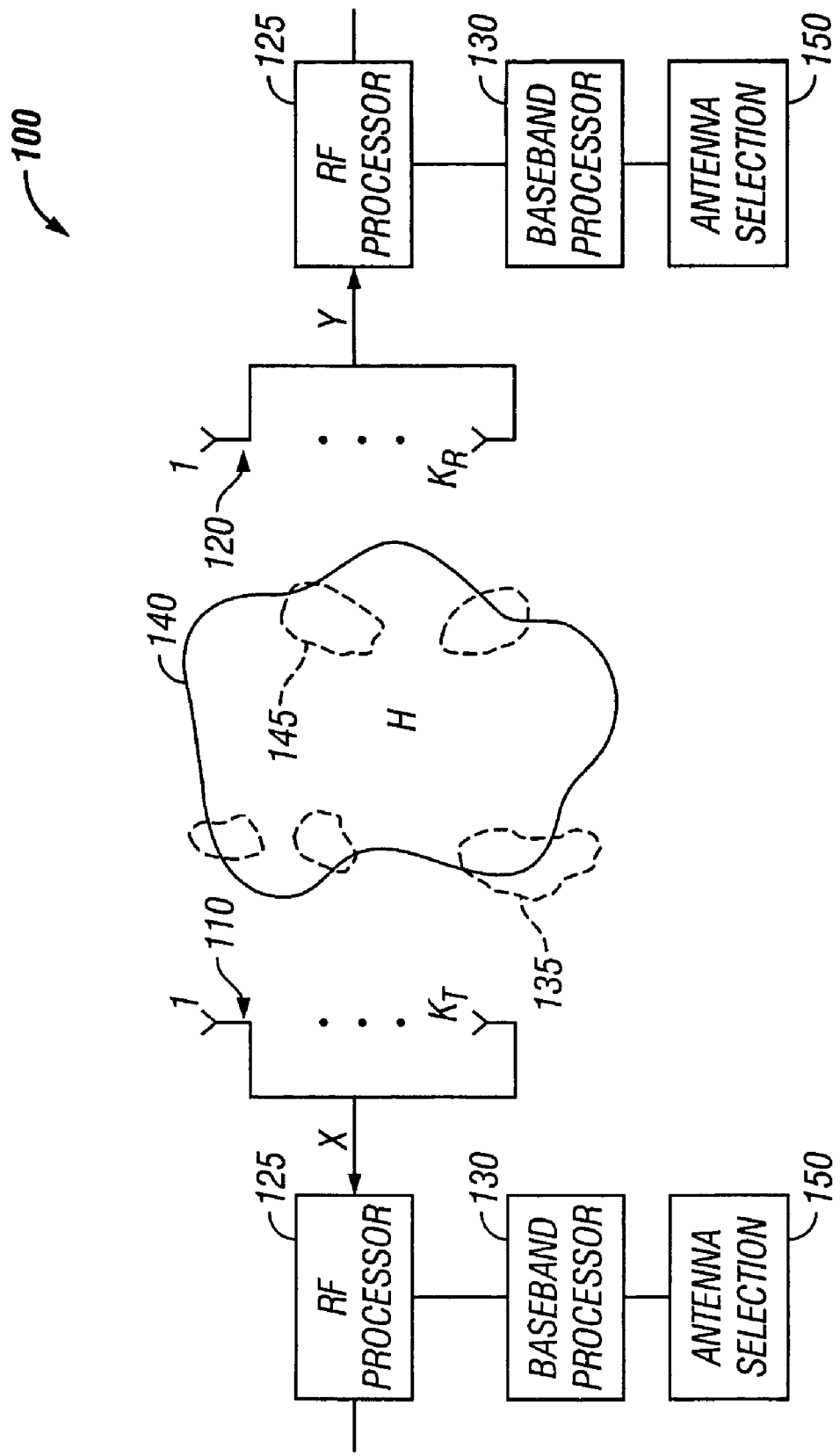
FIG. 1 is a block diagram of a multi-element antenna system according to an embodiment.

FIG. 1 illustrates a wireless multiple-in-multiple-out (MIMO) communication system 100, which includes a first transceiver 105 with multiple antennas 110 and a second transceiver 115 with multiple antennas 120. In an embodiment, transceiver 105 has $K_T$ transmit antennas and transceiver 115 has $K_R$ receive antennas, forming a $K_R \times K_T$ MIMO system. The transceivers may each include an RF (Radio Frequency) processor 125 and a baseband processor 130. The RF processor 125 may up-convert baseband signals from the baseband processor 130 for transmission and down-convert received signals to baseband signals for processing by the baseband processor 130. The transceivers and antennas in the system may be fixed or have low mobility.

For the description below, the first transceiver 105 is designated as a "transmitter" because the first transceiver 105 predominantly transmits signals to the second transceiver 115, which predominantly receives signals and is designated as a "receiver". Despite the designations, both transmitter 105 and receiver 115 may transmit and receive data.

The multiple antennas may achieve high data rates by using a transmission signaling scheme called "spatial multiplexing," where a data bit stream may be demultiplexed into parallel independent data streams. The independent data streams are sent on different transmit antennas 110 to obtain an increase in data rate according to the number of transmit antennas 110 used.

The transmit antennas 110 may transmit signals in a medium 140. The medium may include scatterers 145, e.g., buildings and geological features. The propagation characteristics of the medium may be represented by a matrix H in a channel model.

Most MIMO systems use a statistical channel model that is an idealized abstraction of spatial propagation characteristics and assumes independent ad identically distributed (i.i.d.) fading between different transmit-receive antenna pairs. Idealized channel models may facilitate capacity analysis and space-time coding operations. In practice, however, the channel coefficients between different transmit-receive antenna pairs exhibit correlation due to closely spaced antennas and clustered scattering typical in realistic environments. In such conditions, the capacity of MIMO channels can be substantially lower, depending on the level of correlation.

Correlation refers to the degree to which two variables are related to each other. A correlation coefficient of 1 may indicate the two variables are very correlated, e.g., if one has a high value, the other will also have a high value, whereas a correlation coefficient of 0 may indicate that the variables are relatively independent. Correlation between symbols transmitted (and received) by different antennas in communication channels tends to be inversely proportional to the spacing between antennas and the number of scatterers.

The transmitter 105 and receiver 115 in the MIMO system 100 may communicate over correlated fading channels. In an embodiment, the transmitter 105 may transmit at a fixed data rate ($b_T$ bps/Hz) with equal power allocated to each transmit antenna.

Figure 2:
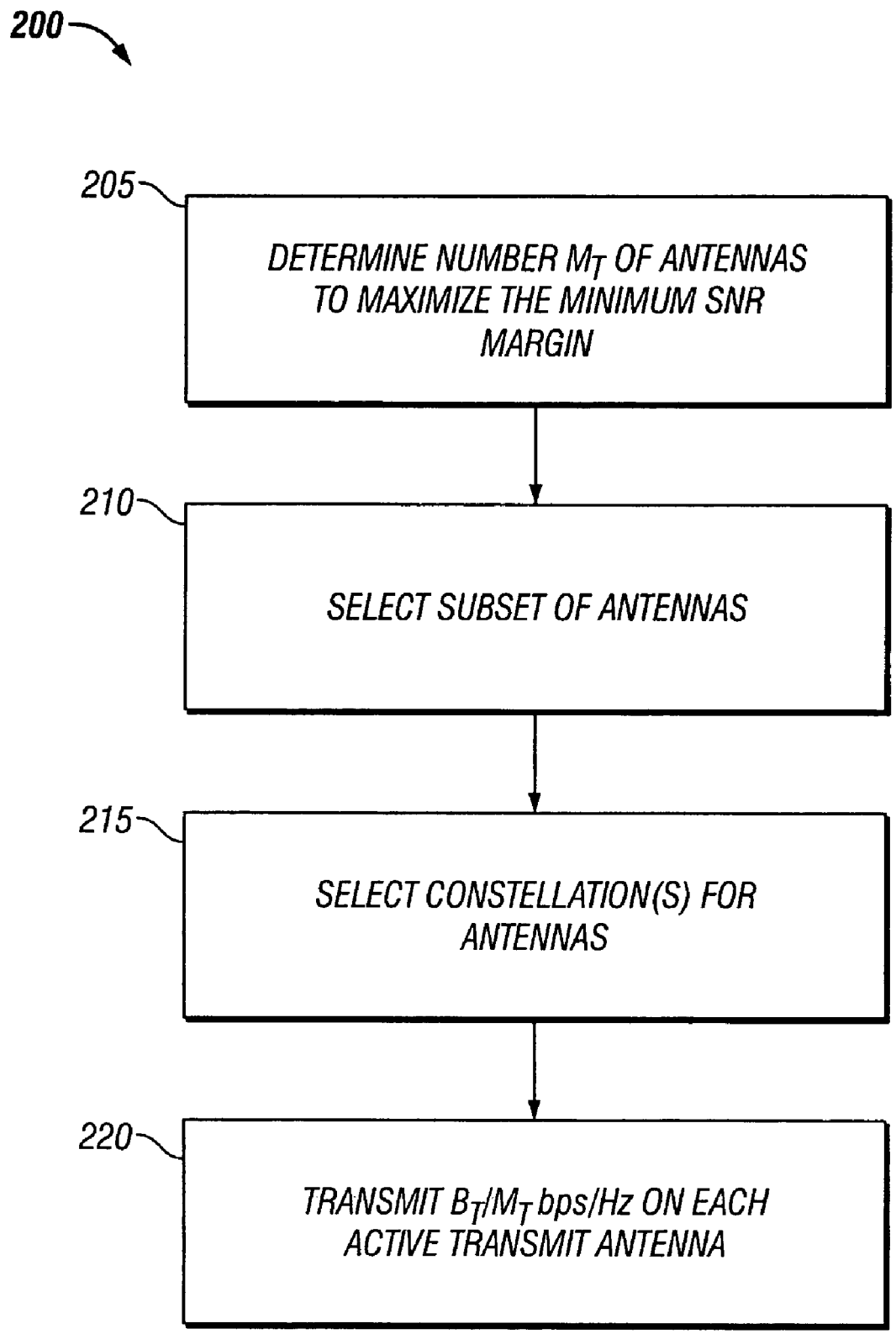
FIG. 2 is a flowchart describing an antenna selection operation.

The transmitter 105 and/or the receiver 115 may include an antenna selection module 150. The antenna selection module at one of the transceivers may perform an antenna selection operation 200 to select a subset of antennas at the transmitter and receiver, as shown in FIG. 2. After antenna selection, $M_T \leq K_T$ transmit and $M_R \leq K_R$ receive antennas are used, with $b_T/M_T$ bps/Hz being sent through each of the $M_T$ active transmit antennas. The antenna selection operation may select an optimum number of transmit antennas and corresponding symbol constellations using channel correlation matrices. The channel correlation matrices are second-order statistics of the propagation medium 140, which change much more slowly than the actual fading of the channel themselves. Since the second-order statistics are relatively stable, the correlation matrixes may be determined using long term averaging. This may alleviate the need to frequently update the configuration of active antennas in the system.

A model for the $M_R \times M_T$ channel matrix $H(M_R, M_T, q, p)$, where p and q denote the indices of the active transmit and receive antennas, respectively, is given by:

$$H(M_R, M_T, q, p) = R_R^{1/2}(M_R, q) H_w(M_R, M_T) R_T^{1/2}(M_T, p) \quad (1)$$

where $R_T(M_T, p)$ and $R_R(M_R, q)$ denote the correlation matrices among the active transmit and receive antennas, respectively, and $H_w(M_R, M_T)$ is an $M_R \times M_T$ matrix whose elements are independent and identically distributed complex Gaussian random variables with zero mean and unit variance The criterion used for selection of the antennas may be maximization of the minimum signal-to-noise ratio (SNR) margin. $SNR_{min}$ denotes the minimum post-processing SNR among all $M_T$ data substreams. A "post-processing" SNR refers to the SNR derived after data from multiple antennas are combined, as opposed to a "pre-processing" SNR derived from data at each antenna. The receiver may use any of a number of detection schemes to determine $SNR_{min}$. ZF (Zero Forcing), MMSE (Minimum Mean Square Error), and V-BLAST (Vertical Bell Laboratories Layered Space-Time) are all well known detection schemes.

In an embodiment, $b_T/M_T$ bps/Hz are allocated on each of the $M_T$ active transmit antennas. Under this condition, the minimum SNR margin is given by $$\lambda_{min} = \frac{SNR_{min}}{\Gamma(2^{b_T/M_T} - 1)} \quad (2)$$

where $\Gamma$ is the SNR gap from capacity, which is nearly constant for most spectral efficiencies encountered in practice.

For a receiver using ZF, MMSE, or V-BLAST detection, $$SNR_{min} \geq \frac{E_S}{M_T N_O} \lambda_{min}(H * H) \quad (3)$$

where $E_s$ is the total transmit energy and $\lambda_{min}(A)$ is the minimum eigenvalue of a square matrix A.

The lower bound for $SNR_{min}$ is given by $$SNR_{min} \geq \frac{E_S}{M_T N_O} \lambda_{min}(R_R) \lambda_{min}(R_T(M_{T,p})) \cdot \lambda_{min}(H_w^*(K_R, M_T) H_w(K_R, M_T)) \quad (4)$$

The active transmit antennas are selected to maximize the minimum SNR margin. From (2) and (4), we have $$\gamma_{min} \geq \frac{E_s \lambda_{min}(R_R) \lambda_{min}(R_T(M_T, p))}{\Gamma M_T N_0 (2^{b_T/M_T} - 1)} \cdot \lambda_{min}(H_w^*(K_R, M_T) H_w(K_R, M_T)) \quad (5)$$

The number $M_T$ and element indices p of active transmit antennas are selected (block 205) such that $$(M_T, p) = \underset{(\tilde{M}_T, \tilde{p})}{\mathrm{argmax}} \frac{\lambda_{min}(R_T(\tilde{M}_T, \tilde{p}))}{\tilde{M}_T (2^{b_T/\tilde{M}_T} - 1)} \cdot \bar{\lambda}_{min}(H_w^*(K_R, \tilde{M}_T) H_w(K_R, \tilde{M}_T)) \quad (6)$$

This may be determined by evaluating equation (6) for $M_T = 1$ to $K_T$.

$\bar{\lambda}_{min}(H_w^*(K_R, \tilde{M}_T) H_w(K_R, \tilde{M}_T))$ is the mean of the minimum eigenvalue of $H_w^*(K_R, \tilde{M}_T) H_w(K_R, \tilde{M}_T)$. The means can be stored in lookup tables for different parameters of $K_R$ and $M_T$.

Once the optimum number of antennas is determined, the actual antennas in the subset may be selected (block 210). The active antennas at the transmitter 105 and the receiver 115 may be selected to provide the largest spacing between adjacent antennas in the antenna array to further minimize correlation.

The constellation for transmission is then selected (block 215). The constellations may be selected from, e.g., binary phase shift keying (BPSK), quadrature phase shift keying (QPSK), 8-point phase shift keying (8-PSK), 16-point quadrature amplitude modulation (16-QAM) and 64-QAM. The number of points transmitted, and hence, the constellation for the antennas, may be determined from ($2^{b_T/M_T}$). Once the antennas are selected, the transmitter 105 may transmit $b_T/M_T$ bps/Hz from each transmit antenna (block 220).

As described above, antenna selection operation 200 may be performed at either the transmitter 105 or the receiver 115. For example, the antenna selection module 150 at the receiver 115 may determine the correlation matrices from signals received from the transmit antennas, calculate $M_T$, and transmit the results to the transmitter 105. Alternatively, the receiver may transmit the correlation matrices to the transmitter, which may use the selection module 150 to calculate $M_T$. The active antenna configuration may be updated by re-executing the antenna selection operation 200. However, since the antenna selection operation is based on second-order statistics, and hence relatively stable, frequent updates may not be necessary.

In an alternative embodiment, the system may induce a successive cancellation receiver (SCR) with a fixed detection order and variable bit allocation across substreams.

Let $b_i$, $i=1, \ldots, M_T$ denote the spectral efficiencies allocated to each of the $M_T$ active transmit antennas. The optimization problem can be stated as follows:

$$\max_{(M_T, M_R, p, q, b_i): \sum_{i=1}^{M_T} b_i = b_T} \min_{i \in \{1, \ldots, M_T\}} \gamma_i \quad (7)$$

where $$\gamma_i = \frac{SNR_i}{\Gamma(2^{b_i} - 1)} \quad (8)$$

is the SNR margin for the i-th substream.

In the SCR system, the pair $(M_T, p)$ may be chosen such that $$(M_T, p) = \quad (9)$$

$$\arg\max_{(\tilde{M}_T, \tilde{p})} \left\{ \frac{1}{\tilde{M}_T} \left[ \text{Indet}(R_T(\tilde{M}_T, \tilde{p})) + \sum_{j=1}^{\tilde{M}_T} \sum_{i=1}^{K_R - j} \frac{1}{i} - b_T \ln 2 \right] - \ln \tilde{M}_T \right\}$$

Once the optimal pair $(M_T, p)$ is chosen, the bit allocation for each transmit antenna is determined as follows. For a given channel realization $H_w$, $$b_{i|H_w} = \log_2\left(\frac{SNR_i}{\Gamma \gamma_i}\right) \quad (10)$$

$$= \frac{b_T}{M_T} + 2\log_2|\lambda_i(R)| - \frac{1}{M_T}\log_2 \det(R * R) \quad (11)$$

for $i=1, \ldots, M_T$. Here $\gamma_t = \gamma_i$, $i=1, \ldots M_T$ and R is the upper triangular matrix obtained from the QR decomposition of the channel matrix H. The results are then averaged over several realizations of $H_w$ and rounded to the nearest integer to obtain the final bit allocation bi, $i=1, \ldots, M_T$. If $$\sum_{i=1}^{M_T} b_i \neq b_T,$$

the bit allocations before rounding that are close to an odd multiple of 0.5 are rounded in the opposite direction until the desired spectral efficiency $b_T$ is obtained. The constellation for the i-th active transmit antenna is selected such that $b_i$ bps/Hz are transmitted.

Simulations were performed to evaluate the performance of the antenna and constellation selection algorithms in correlated fading channels. In all the simulations, we use $K_T = K_R = 6$ and uniform linear arrays with half-wavelength antenna spacing. Two scenarios of correlated fading are evaluated. Scenario 1 consists of i.i.d. fading. Scenario 2 has $R_R = I_{KR}$ and two equally weighted transmit clusters with angles of departure and angle spreads given by $\theta_{T,1} = \pi/6$, $\theta_{T,2} = \pi/2, \sigma_{\theta_{t,1}} = \pi/30, \sigma_{\theta_{t,2}} = \pi/20$.

The fixed data rate is chosen to be $b_T = 12$ bps/Hz. Uncoded transmission and the following signal constellations were considered: BPSK, QPSK, 8-PSK, 16-QAM, and 64-QAM.

The various MIMO detection techniques are evaluated in terms of the bit error rate (BER) as a function of the average SNR, where $SNR \equiv E_s/N_o$.

Figure 3:
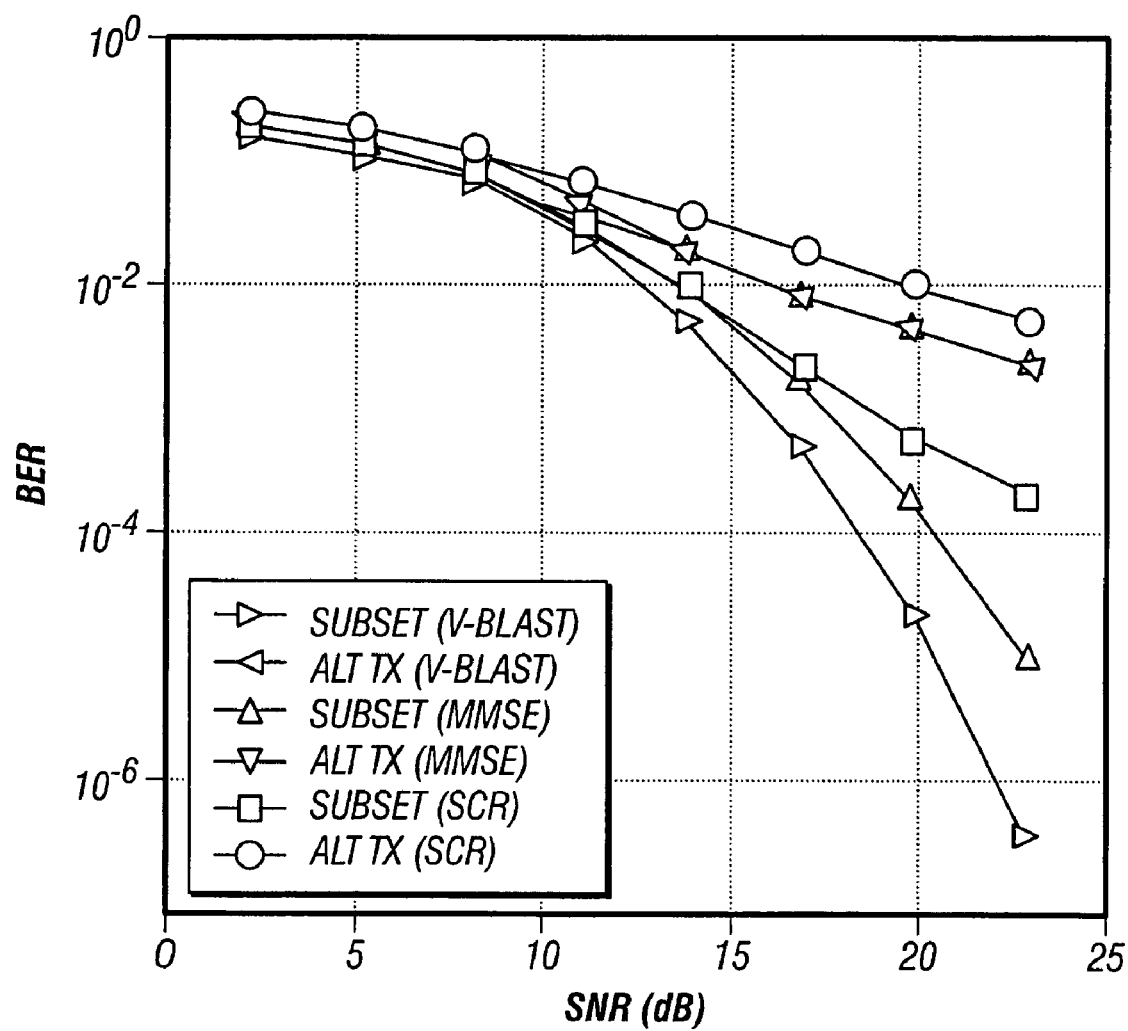
FIG. 3 is a plot illustrating a performance of the system of FIG. 1 using all antennas and a subset of antennas in a first scenario.

The mean value $\bar{\lambda}_{min}(H_w^*(K_R, M_T)H_w(K_R, M_T))$ was determined using 100000 Monte Carlo simulations of complex Wishart matrices. FIG. 3 is a plot of the BER performance for Scenario 1 (i.i.d. fading) of the MMSE, V-BLAST and SCR receivers. As a result of antenna and constellation selection, Antennas 1, 2, and 3 transmit a 16-QAM constellation for the linear and V-BLAST system. For the SCR system, Antennas 1 through 5 are active with transmit constellations 8-PSK, 8-PSK, QPSK, QPSK, and QPSK, respectively. FIG. 3 illustrates that even for i.i.d. fading, there is a significant performance gain for all three receivers by using a subset of the $K_T$ available transmit antennas with higher order constellations compared to activating all transmit antennas with lower order constellations. When all transmit antennas are active, error propagation causes the V-BLAST receiver to perform worse than the MMSE receiver at low to moderate SNRs. The bit allocation is uniform for the SCR system when all transmit antennas are active. When a subset of active transmit antennas is used, the constellation size decreases as the antenna index increases since the transmitted data are estimated by the SCR receiver in decreasing order of the antenna index.

Figure 4:
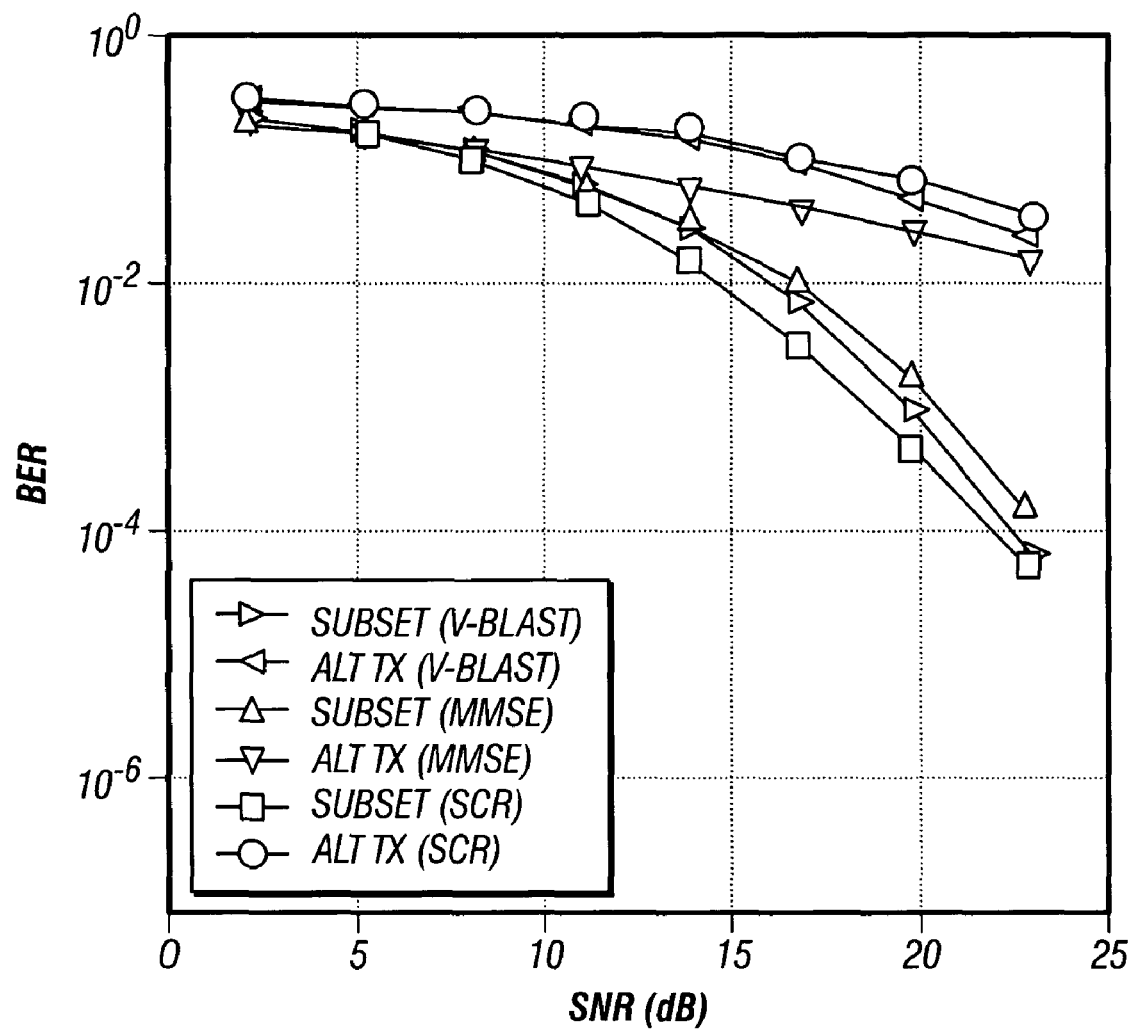
FIG. 4 is a plot illustrating a performance of the system of FIG. 1 using all antennas and a subset of antennas in another scenario.

The BER performance for Scenario 2 is plotted in FIG. 4. After antenna and constellation selection, Antennas 1 and 2 transmit a 64-QAM constellation for the linear and V-BLAST systems. For the SCR system, Antennas 1, 2, 5, and 6 are active with transmit constellations 16-QAM, 8-PSK, 8-PSK, and QPSK, respectively. As in Scenario 1, a large performance gain is observed by activating a subset of transmit antennas. Because of the relatively high transmit antenna correlation for Scenario 2, error propagation causes the V-BLAST and SCR receiver to perform worse than the MMSE receiver when all transmit antennas are active.

The use of second-order statistics, such as channel correlation matrices, for antenna and constellation selection have been described. These second-order statistics are related to signal variance in the medium. In alternative embodiments, other higher-order statistics of the propagation medium may also be used for antenna and constellation selection. These higher order measures may include, for example, third-order statistics (third-order cumulant and bispectrum), which are related to the signal skewness, and fourth-order statistics (fourth-order cumulant and trispectrum), which are related to the signal kurtosis. Like the second-order statistics, these other higher order statistics of the propagations medium may change much more slowly than the actual fading of the channels themselves A number of embodiments have been described. Nevertheless, it will be understood that various modifications may be made without departing from the spirit and scope of the invention. For example, blocks in the flowchart may be skipped or performed out of order and still produce desirable results. Accordingly, other embodiments are within the scope of the following claims.

The invention claimed is:

1. A method comprising:
    selecting a subset of active antennas from a plurality of available antennas in a multi-element antenna system based on higher-order statistics of a propagation medium, where said selecting comprises selecting an optimum number of antennas to maximize a minimum signal-to-noise ratio (SNR) margin.

2. The method of claim 1, wherein the higher-order statistics comprise second-order statistics of the propagation medium.

3. The method of claim 1, where the multi-element antenna system comprises a multiple-in multiple-out (MIMO) system.

4. The method of claim 1, where said selecting comprises selecting the subset of active antennas based on correlation matrices among the active antennas.

5. The method of claim 1, where said selecting comprises selecting the subset of active antennas based on a fixed data rate.

6. The method of claim 1, further comprising allocating substantially equal power to each of said active antennas.

7. A method comprising:
    selecting a subset of active antennas from a plurality of available antennas in a multi-element antenna system based on higher-order statistics of a propagation medium where said selecting comprises determining a subset including $M_T$ active transmit antennas substantially in accordance with the equation $$(M_T, p) = \operatorname*{argmax}_{(\tilde{M}_T, \tilde{p})} \frac{\lambda_{\min}(R_T(\tilde{M}_T, \tilde{p}))}{\tilde{M}_T(2^{b_T/\tilde{M}_T} - 1)} \cdot \bar{\lambda}_{\min}(H_w^*(K_R, \tilde{M}_T)H_w(K_R, \tilde{M}_T)),$$

where p denotes indices of the $M_T$ active transmit antennas, $\tilde{M}_T$ represents a dummy variable for optimizing the $M_T$ active transmit antennas, $\tilde{p}$ represents a dummy variable for optimizing the p indices, $\lambda_{min}$ represents a minimum eigenvalue, $R_T(\tilde{M}_T,\tilde{p})$ represents a correlation matrix among the $M_T$ active transmit antennas, $\bar{\lambda}_{min}(H_w^*(K_R,\tilde{M}_T)H_w(K_R,\tilde{M}_T))$ represents a mean eigenvalue of a square matrix $(H_w^*(K_R,\tilde{M}_T)H_w(K_R,\tilde{M}_T))H_w(K_R,\tilde{M}_T)$ represents an $K_R \times \tilde{M}_T$ matrix having distributed elements, $H_w^*(K_R,\tilde{M}_T)$ represents a complex conjugate of matrix $H_w(K_R,\tilde{M}_T)$, $K_R$ represents a number of receive antennas, $(2^{b_T/\tilde{M}_T}-1)$ represents a constellation for the $M_T$ active transmit antennas, and $b_T$ represents a fixed data rate.

8. A method comprising:
    selecting a subset of active antennas from a plurality of available antennas in a multi-element antenna system based on higher-order statistics of a propagation medium where said selecting comprises determining a subset including $M_T$ active transmit antennas substantially in accordance with the equation $$(M_T, p) = \operatorname*{arg\,max}_{(\tilde{M}_T, \tilde{p})} \left\{ \frac{1}{\tilde{M}_T}\left[\operatorname{Indet}(R_T(\tilde{M}_T, \tilde{p})) + \sum_{j=1}^{\tilde{M}_T} \sum_{i=1}^{K_R - j} \frac{1}{i} - b_T \ln 2 \right] - \ln \tilde{M}_T \right\},$$

where p represents indices of the $M_T$ active transmit antennas, $\tilde{M}_T$ represents a dummy variable for optimizing the $M_T$ active transmit antennas, $\tilde{p}$ represents a dummy variable for optimizing the p indices, $R_T(\tilde{M}_T,\tilde{p})$ represents a correlation matrix among the $M_T$ active transmit antennas, $K_R$ represents a number of receive antennas, and $b_T$ represents a fixed data rate.

9. An apparatus comprising:
    a processor operative to select a subset of active antennas from a plurality of available antennas based on higher-order statistics of a propagation medium where the processor is operative to select an optimum number of antennas to maximize a minimum signal-to-noise ratio (SNR) margin.

10. The apparatus of claim 9, wherein the higher-order statistics comprise second-order statistics of the propagation medium.

11. The apparatus of claim 9, where the apparatus comprises at least a portion of a multiple-in multiple-out (MIMO) device.

12. The apparatus of claim 9 where the processor is operative to select the subset of active antennas based on correlation matrices among the active antennas.

13. The apparatus of claim 9, where the processor is operative to select the subset of active antennas based on a fixed data rate.

14. The apparatus of claim 9 where the processor is operative to allocate substantially equal power to each of said active antennas.

15. An apparatus comprising:
    a processor operative to select a subset of active antennas from a plurality of available antennas based on higher-order statistics of a propagation medium where the processor is operative to select a subset including $M_T$ active transmit antennas substantially in accordance with the equation $$(M_T, p) = \operatorname*{argmax}_{(\tilde{M}_T, \tilde{p})} \frac{\lambda_{\min}(R_T(\tilde{M}_T, \tilde{p}))}{\tilde{M}_T(2^{b_T/\tilde{M}_T} - 1)} \cdot \bar{\lambda}_{\min}(H_w^*(K_R, \tilde{M}_T)H_w(K_R, \tilde{M}_T)),$$

where p represents indices of the $M_T$ active transmit antennas, $\tilde{M}_T$ represents a dummy variable for optimizing the $M_T$ active transmit antennas, $\tilde{p}$ represents a dummy variable for optimizing the p indices, $\lambda_{min}$ represents a minimum eigenvalue, $R_T(\tilde{M}_T,\tilde{p})$ represents a correlation matrix among the $M_T$ active transmit antennas, $\bar{\lambda}_{min}(H_w^*(K_R,\tilde{M}_T)H_w(K_R,\tilde{M}_T))$ represents a mean eigenvalue of a square matrix $(H_w^*(K_R,\tilde{M}_T)H_w(K_R,\tilde{M}_T))H_w(K_R,\tilde{M}_T)$ represents an $K_R \times \tilde{M}_T$ matrix having distributed elements, $H_w^*(K_R,\tilde{M}_T)$ represents a complex conjugate of matrix $H_w(K_R,\tilde{M}_T)$, $K_R$ represents a number of receive antennas, $(2^{b_T/\tilde{M}_T}-1)$ represents a constellation for the $M_T$ active transmit antennas, and $b_T$ represents a fixed data rate.

16. An apparatus comprising:
    a processor operative to select a subset of active antennas from a plurality of available antennas based on higher-order statistics of a propagation medium where the processor is operative to select a subset including $M_T$ active transmit antennas substantially in accordance with the equation $$(M_T, p) = \operatorname*{arg\,max}_{(\tilde{M}_T, \tilde{p})} \left\{ \frac{1}{\tilde{M}_T}\left[\operatorname{Indet}(R_T(\tilde{M}_T, \tilde{p})) + \sum_{j=1}^{\tilde{M}_T} \sum_{i=1}^{K_R - j} \frac{1}{i} - b_T \ln 2 \right] - \ln \tilde{M}_T \right\},$$

where p denotes indices of the $M_T$ active transmit antennas, $\tilde{M}_T$ represents a dummy variable for optimizing the $M_T$ active transmit antennas, $\tilde{p}$ represents a dummy variable for optimizing the p indices, $R_T(\tilde{M}_T,\tilde{p})$ represents a correlation matrix among the $M_T$ active transmit antennas $K_R$ represents a number of receive antennas, and $b_T$ represents a fixed data rate.

17. An apparatus comprising:
    a processor including means for selecting a subset of active antennas from a plurality of available antennas based on higher-order statistics of a propagation medium, where said selecting comprises selecting an optimum number of antennas to maximize a minimum signal-to-noise ratio (SNR) margin.

18. The apparatus of claim 17, wherein the higher-order statistics comprise second-order statistics of the propagation medium.

19. The apparatus of claim 17, where the apparatus comprises at least a portion of a multiple-in multiple-out (MIMO) device.

20. The apparatus of claim 17 further comprising means for selecting the subset of active antennas based on correlation matrices among the active antennas.

21. The apparatus of claim 17, further comprising means for selecting the subset of active antennas based on a fixed data rate.

22. The apparatus of claim 17, further comprising means for allocating substantially equal power to each of said active antennas.

23. An apparatus comprising:
a processor including means for selecting a subset of active antennas from a plurality of available antennas based on higher-order statistics of a propagation medium and means for determining a subset including $M_T$ active transmit antennas substantially in accordance with the equation $$(M_T, p) = \underset{(\tilde{M}_T, \tilde{p})}{\mathrm{argmax}} \frac{\lambda \min(R_T(\tilde{M}_T, \tilde{p}))}{\tilde{M}_T(2^{b_T/\tilde{M}_T} - 1)} \cdot \bar{\lambda}_{\min}(H_w^*(K_R, \tilde{M}_T) H_w(K_R, \tilde{M}_T)),$$

where p represents indices of the $M_T$ active transmit antennas, $\tilde{M}_T$ represents a dummy variable for optimizing the $M_T$ active transmit antennas, $\tilde{p}$ represents a dummy variable for optimizing the p indices, $\lambda_{min}$ represents a minimum eigenvalue, $R_T(\tilde{M}_T,\tilde{p})$ represents a correlation matrix among the $M_T$ active transmit antennas, $\bar{\lambda}_{min}(H_w^*(K_R,\tilde{M}_T))H_w(K_R,\tilde{M}_T)$ represents a mean eigenvalue of a square matrix $(H_w^*(K_R,\tilde{M}_T)H_w(K_R,\tilde{M}_T))H_w(K_R,\tilde{M}_T)$ represents an $K_R \times \tilde{M}_T$ matrix having distributed elements, $H_w^*(K_R,\tilde{M}_T)$ represents a complex conjugate of matrix $H_w(K_R,\tilde{M}_T)$, $K_R$ represents a number of receive antennas, $(2^{b_T/\tilde{M}_T}-1)$ represents a constellation for the $M_T$ active transmit antennas, and $b_T$ represents a fixed data rate.

24. An apparatus comprising:
a processor including means for selecting a subset of active antennas from a plurality of available antennas based on higher-order statistics of a propagation medium and means for determining a subset including $M_T$ active transmit antenna substantially in accordance with the equation $$(M_T, p) = \underset{(\tilde{M}_T, \tilde{p})}{\arg\max} \left\{ \frac{1}{\tilde{M}_T} \left[ \mathrm{lndet}(R_T(\tilde{M}_T, \tilde{p})) + \sum_{j=1}^{\tilde{M}_T} \sum_{i=1}^{K_R-j} \frac{1}{i} - b_T \ln 2 \right] - \ln \tilde{M}_T \right\},$$

where p represents indices of the $M_T$ active transmit antennas, $\tilde{M}_T$ represents a dummy variable for optimizing the $M_T$ active transmit antennas, $\tilde{p}$ represents a dummy variable for optimizing the p indices, $R_T(\tilde{M}_T,\tilde{p})$ represents a correlation matrix among the $M_T$ active transmit antennas $K_R$ denote a number of receive antennas, and $b_T$ represents a fixed data rate.

25. A system comprising:
a propagation medium;
a first transceiver including a plurality of available antennas;
a second transceiver including
a plurality of available antennas
a processor operative to determine higher-order statistics of the propagation medium from signals received from the plurality of available antennas at the first transceiver; and
an antenna selection module operative to select a subset of active antennas from the plurality of available antennas based on higher-order statistics of the propagation medium,
where the processor is operative to select an optimum number of antennas to maximize a minimum signal-to-noise ratio (SNR) margin.

26. The system of claim 25, where the system comprises at least a portion of a multiple-in multiple-out (MIMO) device.

27. The system of claim 25 where the processor is operative to select the subset of active antennas based on correlation matrices among the active antennas.

28. The system of claim 25 where the processor is operative to select the subset of active antennas based on a fixed data rate.

29. The system of claim 25 where the processor is operative to allocate substantially equal power to each of said active antennas.

30. The system of claim 25, wherein the higher-order statistics comprise second-order statistics of the propagation medium.

31. A system comprising:
a propagation medium;
a first transceiver including a plurality of available antennas;
a second transceiver including
a plurality of available antennas
a processor operative to determine higher-order statistics of the propagation medium from signals received from the plurality of available antennas at the first transceiver; and
an antenna selection module operative to select a subset of active antennas from the plurality of available antennas based on higher-order statistics of a propagation medium,
where the processor is operative to select a subset including $M_T$ active transmit antennas substantially in accordance with the equation $$(M_T, p) = \underset{(\tilde{M}_T, \tilde{p})}{\mathrm{argmax}} \frac{\lambda \min(R_T(\tilde{M}_T, \tilde{p}))}{\tilde{M}_T(2^{b_T/\tilde{M}_T} - 1)} \cdot \bar{\lambda}_{\min}(H_w^*(K_R, \tilde{M}_T) H_w(K_R, \tilde{M}_T)),$$

where p represents indices of the $M_T$ active transmit antennas, $\tilde{M}_T$ represents a dummy variable for optimizing the $M_T$ active transmit antennas, $\tilde{p}$ represents a dummy variable for optimizing the p indices, $\lambda_{min}$ represents a minimum eigenvalue, $R_T(\tilde{M}_T,\tilde{p})$ represents a correlation matrix among the $M_T$ active transmit antennas, $\bar{\lambda}_{min}(H_w^*(K_R,\tilde{M}_T)H_w(K_R,\tilde{M}_T))$ represents a mean eigenvalue of a square matrix $(H_w^*(K_R,\tilde{M}_T)H_w(K_R,\tilde{M}_T))H_w(K_R,\tilde{M}_T)$ represents an $K_R \times \tilde{M}_T$ matrix having distributed elements, $H_w^*(K_R,\tilde{M}_T)$ represents a complex conjugate of matrix $H_w(K_R,\tilde{M}_T)$, $K_R$ represents a number of receive antennas, $(2^{b_T/\tilde{M}_T}-1)$ represents a constellation for the $M_T$ active transmit antennas, and $b_T$ represents a fixed data rate.

32. The system of claim 31, wherein the higher-order statistics comprise second-order statistics of the propagation medium.

33. A system comprising:
a propagation medium;
a first transceiver including a plurality of available antennas;
a second transceiver including a plurality of available antennas;
a processor operative to determine higher-order statistics of the propagation medium from signals received from the plurality of available antennas at the first transceiver; and
an antenna selection module operative to select a subset of active antennas from the plurality of available antennas based on higher-order statistics of the propagation medium,
where the processor is operative to select a subset including $M_T$ active transmit antennas substantially in accordance with the equation $$(M_T, p) = \arg\max_{(\tilde{M}_T,\tilde{p})} \left\{ \frac{1}{\tilde{M}_T}\left[ \text{lndet}(R_T(\tilde{M}_T, \tilde{p})) + \sum_{j=1}^{\tilde{M}_T} \sum_{i=1}^{K_R-j} \frac{1}{i} - b_T\ln 2 \right] - \ln\tilde{M}_T \right\},$$

where p represents indices of the $M_T$ active transmit antennas, $\tilde{M}_T$ represents a dummy variable for optimizing the $M_T$ active transmit antennas, $\tilde{p}$ represents a dummy variable for optimizing the p indices, $R_T(\tilde{M}_T,\tilde{p})$ represents a correlation matrix among the $M_T$ active transmit antennas, $K_R$ represents a number of receive antennas, and $b_T$ represents a fixed data rate.

34. The system of claim 33, wherein the higher-order statistics comprise second-order statistics of the propagation medium.

* * * * *